L. DUCA.
AUTOMATIC CLUTCH.
APPLICATION FILED DEC. 26, 1919.

1,375,576.

Patented Apr. 19, 1921.

Inventor:
Luigi Duca
By Lawrence Langner
Attorney

UNITED STATES PATENT OFFICE.

LUIGI DUCA, OF TURIN, ITALY, ASSIGNOR TO SOCIETA ANONIMA MANIFATTURA LUIGI DUCA, OF BUSTA ARSIZIO, ITALY, A COMPANY OF ITALY.

AUTOMATIC CLUTCH.

1,375,576.  Specification of Letters Patent.  Patented Apr. 19, 1921.

Application filed December 26, 1919. Serial No. 347,294.

*To all whom it may concern:*

Be it known that I, LUIGI DUCA, a subject of the King of Italy, and resident of Turin, Italy, have invented certain new and useful Improvements in Automatic Clutches, of which the following is a specification.

This invention relates to free-wheel clutches, that is to clutches adapted to engage a driving member with a driven member when said driving member has a higher speed than the driven one and to disengage said members when the driven one has reached a higher speed than said driving member.

The clutch according to this invention may be used with advantage in connection with electric starting devices for explosion engines for coupling the engine shaft with the starting electromotor shaft during the starting period and for uncoupling said parts after said engine has started; the same is described in the following specification in connection with such a use but it is to be understood that the said clutch may be used for any other purpose.

The clutch according to this invention has as peculiar features a silent running and a safe operation, the same being further adapted to operate in either direction by merely reversing the position of one of its parts without requiring the provision of different pieces for the reverse operation.

Figure 1:
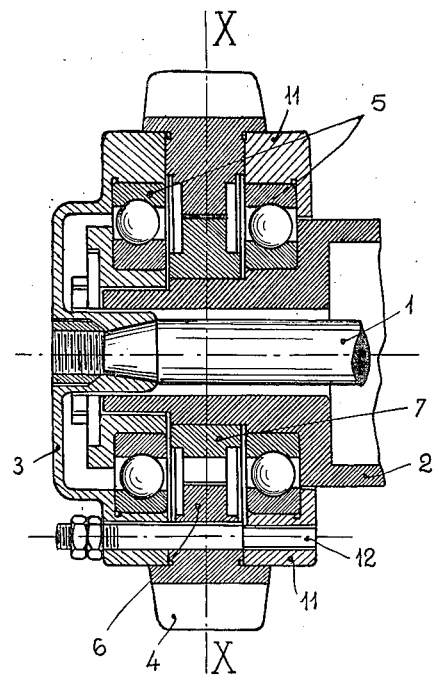
Figure 2:
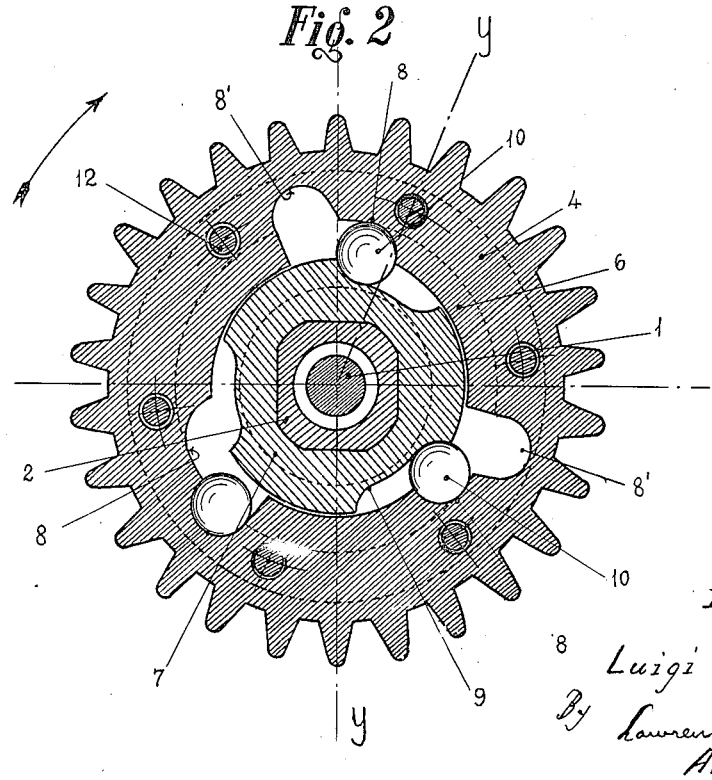

The annexed drawing shows an embodiment of this invention, Figure 1 being a central section on line $y$—$y$, Fig. 2; Fig. 2 is a transverse section on line $x$—$x$, Fig. 1.

In said figures 2 is the driving member, say the shaft of the starting electromotor (not shown) which in this embodiment is made hollow to provide a passage for a concentric shaft 1 adapted to operate the dynamo or generator of the starting and lighting plant. Said hollow shaft 2 is provided with ball bearings 5—5 on which runs a pinion 4 adapted to mesh with a corresponding pinion (not shown) which drives the engine shaft.

Said pinion 4 is secured on the outer rings of said ball bearings 5—5 by means of a collar 11 and of a cup 3, said parts being connected together by means of bolts 12; said central shaft 1 is rigid with cup 3 and therefore with pinion 4.

Said pinion 4 is provided with an inner rim 6 intermediate said ball bearings 5, and hollow shaft 2 is provided with an outer rim 7 facing said rim 6.

Rim 6 is provided with a number of recesses each consisting of a notch 8 and of a deeper cavity 8' connected with said notch, said recesses having their edges cut according to arcs of circles.

In the drawing said rim 6 is shown provided with three recesses 8—8' but obviously there may be any desired number of them.

Rim 7 of hollow shaft 2 is provided with a like number of recesses 9 having an even depth throughout their extent and having their edges cut along arcs of circles. The body portions of these recesses are substantially concentric with the axis of the driving shaft 2, while their end portions have radii equal to the radii of the subsequently-mentioned locking members.

The depth of the coöperating notches 8 and recesses 9 is about equal to or slightly greater than the radii of the connecting or locking members 10 which are arranged in said notches and recesses and are here shown as in the form of spherical elements or balls, though they may, of course, be of any other suitable type, rollers for example. The cavities 8' have a depth which is somewhat greater than the diameters of said balls.

The operation is substantially as follows:—Assuming that pinion 4 rotates in the direction of the arrow (Fig. 2) when the engine is running, it will be apparent that the shaft 2 of the starting motor must rotate in the same direction in order to start the engine. When said starting shaft is rotated in the direction indicated, the locking members or balls 10 will be engaged between the edges of the notches 8 and recesses 9, thereby coupling the rims 7 and 6 together and, therefore, the starting shaft and pinion which are rigid, respectively, with said parts.

After the engine has started, and the starting motor has stopped—or, generally speaking, when pinion 4 and rim 6, which is rigid therewith, have attained a higher speed than rim 7 and shaft 2—the balls 10 are caused to enter the cavities 8', thereby effecting the uncoupling of rims 6 and 7 and associated parts from each other. The depth of the cavities 8' is somewhat greater than the diameter of the balls; and since they are provided in the outer clutch member, *i. e.*, the rim 6 of pinion 4 which is caused to rotate as long as the engine continues to run, the balls are forced to enter said cavities by the centrifugal action exerted upon them and are therefore held out of contact with rim 7, thereby avoiding noise as well as wear on the balls, and at the same time precluding accidental clamping of the balls between the rims, while the engine is running.

The automatic clutch construction above described may be applied to engines of various types and may be employed in connection with different arrangements of starting motors. For instance, if it be required that the pinion 4 rotate in a direction opposite to that indicated by the arrow,—i. e., counter-clockwise—it is sufficient to remove said pinion by unscrewing bolts 12 and to arrange it in reversed position in the clutch, in which case the cavity portions 8′ of the recesses will be at the right-hand ends thereof, and the notches 8 will be at the left-hand ends.

Modifications and changes in respect of the construction disclosed herein may be readily made without departing from the scope of the invention.

I claim as my invention:

1. An automatic clutch, comprising concentric driving and driven members having confronting annular rims which are formed with coöperating recesses; and a locking element associated with each pair of coöperating recesses; each recess in the driving member having a body portion, the surface of which is concentric with the axis of the driving member, and arcuate end portions whose radii of curvature are equal to the radius of the associated locking element; and each recess in the driven member having an arcuate portion whose radius of curvature is equal to the radius of the locking element, and an adjacent portion whose depth is greater than the diameter of said locking element.

2. An automatic clutch, comprising concentric driving and driven members having confronting annular rims which are formed with coöperating recesses; and a locking ball associated with each pair of coöperating recesses; each recess in the driving member being limited at the bottom by a curved surface concentric with the axis of the driving member, and at both ends by curved surfaces having the same radii as the associated ball; and each recess in the driven member including a curved notch having the same radius as the ball and a cavity adjacent the notch having a depth greater than the diameter of the ball.

Signed at Turin, Italy, Dec. 8, 1919.

LUIGI DUCA.